United States Patent
Monereau et al.

[11] Patent Number: 6,090,185
[45] Date of Patent: Jul. 18, 2000

[54] PROCESS FOR GAS SEPARATION BY ADSORPTION WITH VARIABLE PRODUCTION RATE

[75] Inventors: Christian Monereau; Nathalie Derive, both of Paris; Dominique Rouge, Malakoff; Christophe Montfort, Buc; Jean-Claude Calviac, Joinville-le-Pont, all of France

[73] Assignee: L'Air Liquide, Societe Anonyme pour l'Etude et l'Exploitation des Procedes Georges Claude, Paris Cedex, France

[21] Appl. No.: 09/215,562

[22] Filed: Dec. 18, 1998

[30] Foreign Application Priority Data

Dec. 18, 1997 [FR] France ................... 97 16066

[51] Int. Cl.$^7$ .................................. B01D 53/047
[52] U.S. Cl. ................... 95/102; 95/105; 95/130
[58] Field of Search ................ 95/96–98, 100–105, 95/130, 138

[56] References Cited

U.S. PATENT DOCUMENTS

| | | | |
|---|---|---|---|
| 3,703,068 | 11/1972 | Wagner | 95/98 X |
| 4,197,096 | 4/1980 | Sebastian et al. | 55/163 |
| 4,315,759 | 2/1982 | Benkmann | 95/98 X |
| 4,323,370 | 4/1982 | Leitgeb | 95/103 X |
| 4,561,865 | 12/1985 | McCombs et al. | 55/25 |
| 4,693,730 | 9/1987 | Miller et al. | 55/18 |
| 4,761,165 | 8/1988 | Stöcker et al. | 95/98 X |
| 5,015,271 | 5/1991 | Reiss | 95/96 X |
| 5,015,272 | 5/1991 | Okada et al. | 95/100 X |
| 5,042,994 | 8/1991 | Smolarek | 95/101 X |
| 5,474,595 | 12/1995 | McCombs | 95/96 X |
| 5,486,226 | 1/1996 | Ross et al. | 95/96 X |
| 5,531,807 | 7/1996 | McCombs | 95/96 X |
| 5,536,299 | 7/1996 | Girard et al. | 95/103 X |
| 5,658,371 | 8/1997 | Smolarek et al. | 95/101 |
| 5,679,134 | 10/1997 | Brugerolle et al. | 95/96 |
| 5,730,778 | 3/1998 | Hill et al. | 95/96 X |
| 5,733,359 | 3/1998 | Doong et al. | 95/98 X |
| 5,746,806 | 5/1998 | Aylsworth et al. | 95/96 X |
| 5,755,856 | 5/1998 | Miyake et al. | 95/102 X |
| 5,858,063 | 1/1999 | Cao et al. | 95/98 X |
| 5,871,564 | 2/1999 | McCombs | 95/98 |
| 5,906,672 | 5/1999 | Michaels et al. | 95/96 X |
| 5,906,674 | 5/1999 | Tan et al. | 95/102 X |
| 5,942,025 | 8/1999 | Monereau et al. | 95/98 |

FOREIGN PATENT DOCUMENTS

| | | |
|---|---|---|
| 0 458 350 | 11/1991 | European Pat. Off. . |
| 0 689 862 | 1/1996 | European Pat. Off. . |
| 33 06 371 | 8/1984 | Germany . |
| 2 259 871 | 3/1993 | United Kingdom . |

*Primary Examiner*—Robert H. Spitzer
*Attorney, Agent, or Firm*—Young & Thompson

[57] ABSTRACT

According to this process, in the case of a reduction in the production rate, the maximum pressure PM of the cycle is lowered and the ratio of this maximum pressure to the minimum pressure Pm of the cycle is reduced, in particular by altering the durations of compression and decompression stages. The process is applicable to the production of oxygen at variable rate.

14 Claims, 3 Drawing Sheets

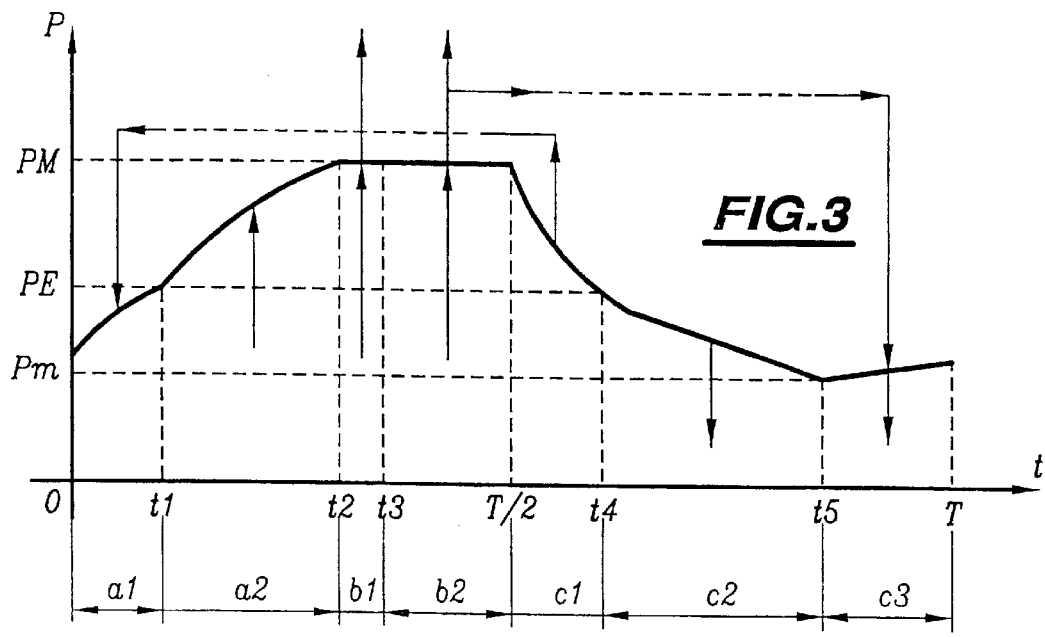
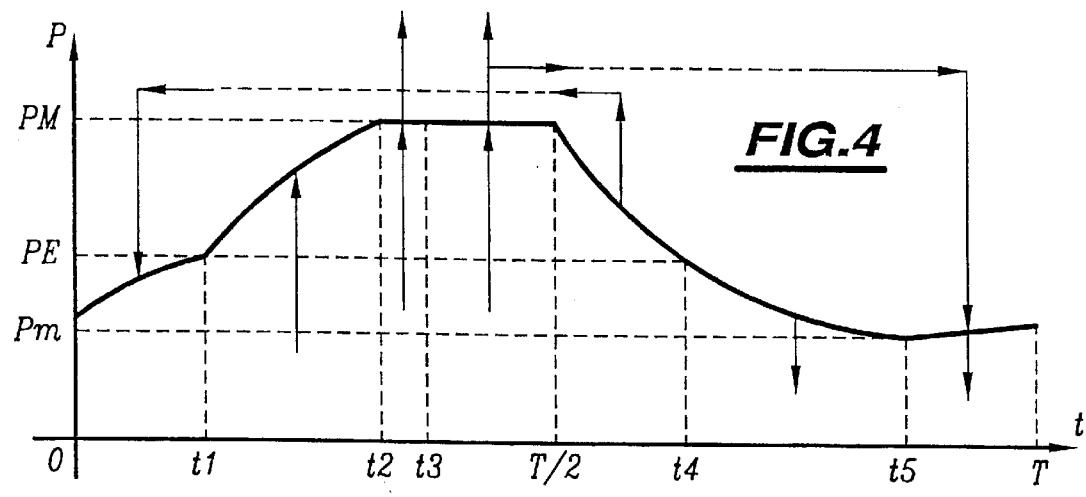
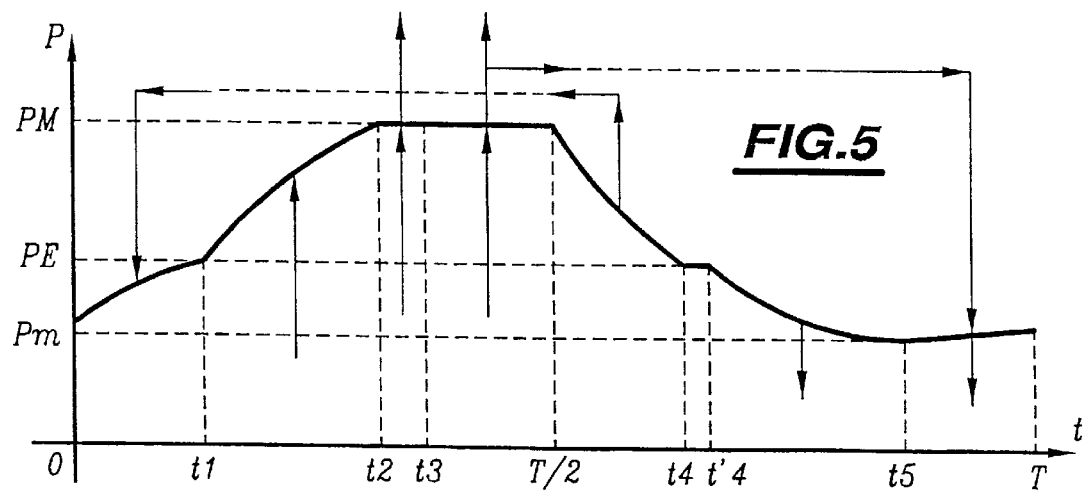

6,090,185

PROCESS FOR GAS SEPARATION BY ADSORPTION WITH VARIABLE PRODUCTION RATE

FIELD OF THE INVENTION

The present invention relates to a process for treating a gas mixture by pressure swing adsorption (PSA), of the type in which at least one adsorber is used, in which a cycle comprising the following successive steps is carried out for a given nominal production:

- a phase of production by circulating the mixture through the adsorber in a so-called cocurrent direction and recovering a fraction enriched in the less adsorbable compounds, during which phase the maximum pressure PM of the cycle is reached,
- a regeneration phase, including at least one depressurization step during which the minimum pressure Pm of the cycle is reached, and
- a phase of repressurizing the adsorber to the initial pressure of the production phase.

The invention applies in particular to the production of impure oxygen, particularly having a purity of the order of 90 to 95%, from atmospheric air. This production gas will be referred to below as "oxygen".

BACKGROUND OF THE INVENTION

The pressures referred to here are absolute pressures.

The aforementioned adsorption cycles are referred to as transatmospheric. They are carried out in units which generally comprise one or two adsorbers, a compressor or a blower for supplying air, a vacuum pump and, if necessary, an oxygen storage vessel for making the production rate uniform. The blower and the pump are generally of the "Roots" positive-displacement type and may be combined into a single machine in the case of a single-adsorber unit. For the sake of economy and reliability, this or these machine(s) do(es) not generally have a speed variator, and the invention is based on this assumption, and also on that of a substantially constant purity of the oxygen which is produced.

The main parameters of the cycle, in particular the levels of the maximum or high pressure PM and the minimum or low pressure Pm, are determined at the unit's design stage so as to optimize the cost of the oxygen production for a given nominal production rate. Depending on the various economic factors taken into consideration for this optimization, the pressure ratio PM/Pm may range from about 2.0 to values of from 6 to 8.

The invention will be explained below with reference to a two-adsorber unit.

With the two machines processing constant flow rates, if the oxygen demand decreases from the nominal production and the durations of the steps remain unchanged, the effect on the pressures of the adsorbers is small since the oxygen which is produced represents only about 10% of the air flow rate treated. The energy consumed by the machines consequently remains substantially constant, so that the specific energy $E_s$, which is the energy consumed per m$^3$ of oxygen produced, increases approximately in inverse proportion to the delivery rate.

For example, if for the nominal production of 100 the specific energy $E_s$ is 100, a production of 80 will give $E_s$=125 approximately, and a production of 50 will give $E_s$=200 approximately.

This mode of operation is adopted only if the unit in question operates nearly always at full capacity, or if the cost of the energy is very low.

Furthermore, with this assumption, the purity of the oxygen which is produced improves when the demand decreases.

In order to improve the energy consumption under reduced-load operation, it has been proposed for this type of cycle (EP-A-0 458 350) to add a waiting time or dead time to the basic cycle, during which the machines run idle, that is to say they have their inlets and their outlets in communication with the atmosphere. The cycle is lengthened by the duration of the waiting time, which reduces the number of cycles per hour and therefore the oxygen production of the unit.

Since the machines have low energy consumption during the waiting time, a substantially reduced specific energy $E_s$ is obtained in reduced-load operation in comparison with the previous case.

Thus, with the numerical examples assumed above, for a production of 80, $E_s$=107 to 112, and for a production of 50, $E_s$=120 to 130.

This specific energy is, however, still higher than the nominal specific energy because of the extra consumption of the machines during their extended idle operation.

SUMMARY OF THE INVENTION

The object of the invention is to provide a process which, without extra investment, makes it possible to obtain a specific energy less than or equal to the nominal specific energy over a wide range of production below nominal operation, and in any case less at any point than what can be obtained with the previous method.

To this end, the invention relates to a process of the aforementioned type, characterized in that, in the case of a reduction in the production rate, the maximum pressure PM is lowered and the ratio PM/Pm is reduced.

The process according to the invention may have one or more of the following characteristics:

- in the case of a reduction in the production rate, the duration of a step of recompression of the adsorber with the mixture is reduced so as to reduce the pressure PM;
- in the case of a reduction in the production rate, the duration of the depressurization step is reduced so as to raise the pressure Pm;
- in the case of a reduction in the production rate, the durations of the other steps of the cycle are kept unchanged;
- in the case of a reduction in the production rate, the duration of a countercurrent first recompression step of the repressurization phase and/or the duration of a cocurrent first decompression step of the regeneration phase is or are extended;
- in the case of a reduction in the production rate, the duration of the countercurrent first recompression step and that of the cocurrent first decompression step are extended, these being two concomitant steps carried out by full or partial balancing of the pressures between two adsorbers;
- in the case of a reduction in the production rate, at least one dead time, during which the adsorber is isolated, is added to the cycle;
- the dead time is provided after a countercurrent first recompression step of the repressurization phase and/or after a cocurrent first decompression step of the regeneration phase;
- the cycle successively comprises, during the regeneration phase, a cocurrent first decompression step, a step of countercurrent second decompression to the low pressure and a step of countercurrent elution with the production gas, with simultaneous pumping;

the cycle successively comprises, during the regeneration phase, a cocurrent first decompression step, a countercurrent second decompression step and a step of countercurrent elution with the production gas, with simultaneous pumping, during which the pressure Pm is reached;

the cycle successively comprises, during the repressurization phase, a countercurrent first recompression step and a final recompression step including at least the cocurrent introduction of the mixture;

PM is substantially greater than atmospheric pressure, in particular between 1.2 and 2 bar and more particularly between 1.35 and 1.65 bar;

Pm lies in the range 0.20 to 0.65 bar and more particularly in the range 0.3 to 0.45 bar abs;

the production gas is oxygen whose purity is substantially the same for the nominal production rate and for the reduced production rate.

BRIEF DESCRIPTION OF THE DRAWINGS

Examples of embodiments of the invention, given by way of illustration but without implying any limitation, will now be described with reference to the appended drawings, in which:

FIG. 3 is a similar diagram which illustrates the modified cycle for reduced production;

FIGS. 4 to 6 are similar diagrams relating to different variants of a cycle modified for reduced production.

DETAILED DESCRIPTION OF THE INVENTION

Figure 1:
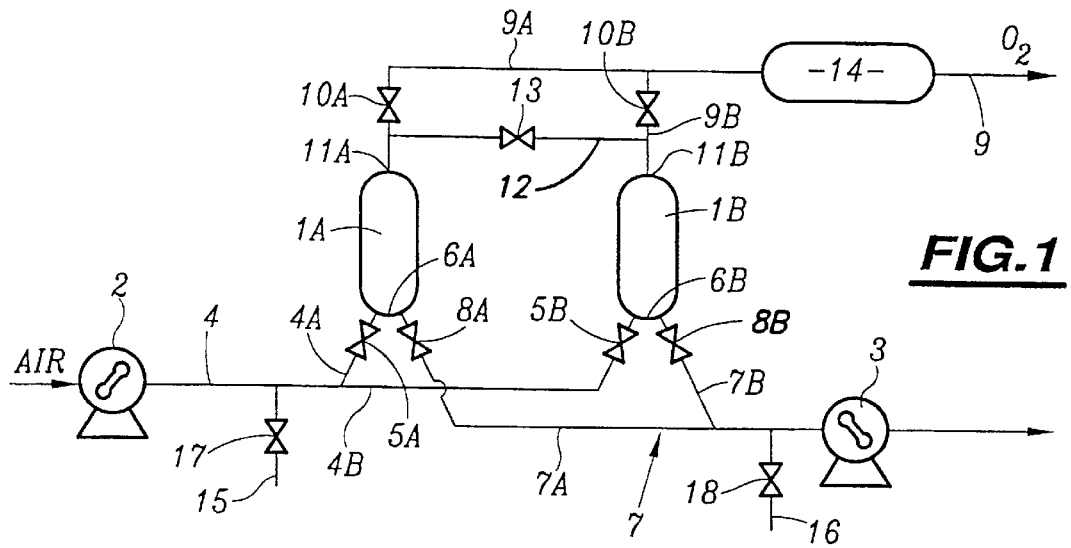
FIG. 1 schematically represents a two-adsorber unit designed for implementing the process according to the invention.

The plant represented in FIG. 1 is intended to produce oxygen-enriched air, or impure oxygen (referred to as "oxygen" for the sake of simplicity), preferably at a level of between 90 and 95% approximately, from atmospheric air.

The plant essentially comprises two adsorbers 1A and 1B, a compressor or a blower 2, a vacuum pump 3 and a set of pipes and valves, as well as control and regulating means (not shown) which are designed for implementing the cycle illustrated in FIGS. 2 to 6. The compressor and the pump are positive-displacement machines of the "Roots" type and run continuously at constant speed.

FIG. 1 schematically represents:

an atmospheric-air supply pipe 4 which starts from the output of the compressor 2 and splits into two branches 4A, 4B which are provided with respective supply valves 5A, 5B and are connected respectively to the lower inlet 6A, 6B of the adsorbers;

a purge/elution pipe 7 which splits into two branches 7A, 7B which are provided with purge/elution valves 8A, 8B and start respectively from the inlets 6A, 6B of the adsorbers;

a production pipe 9 which splits into two branches 9A, 9B which are provided with production valves 10A, 10B and start respectively from the upper outlets 11A, 11B of the adsorbers; and a balancing/elution pipe 12 which directly connects the outlets 11A and 11B together and which is provided with a balancing/elution valve 13.

A buffer vessel 14 is fitted into the pipe 9.

The intake of the compressor 2 and the output of the vacuum pump 3 are in communication with the surrounding atmosphere. The adsorbers 1A to 1B each contain at least one bed of an adsorbent designed for selectively adsorbing nitrogen from air, which in this example is a molecular sieve of the CaA type or a lithium-exchanged zeolite. Furthermore, bypasses 15 and 16, provided with a respective valve 17, 18, are respectively tapped to the pipes 4 and 7, just downstream of the compressor 2 and just upstream of the pump 3. These bypasses deliver to the surrounding atmosphere.

Figure 2:
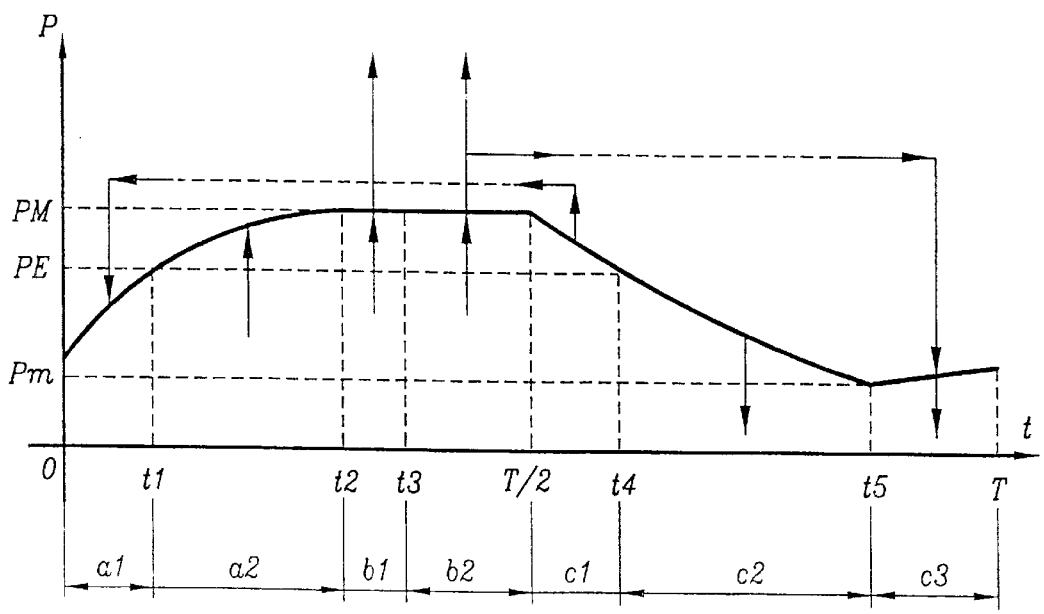
FIG. 2 is a diagram which illustrates a typical cycle employed by this unit for nominal production.

By means of the plant thus described, a transatmospheric pressure swing adsorption cycle as illustrated in FIG. 2 is implemented by way of nonlimiting example.

In this FIG. 2, where the times t are plotted on the abscissa and the absolute pressures P are plotted on the ordinate, the lines oriented by arrows indicate the motion and destinations of the gas streams. When the arrows are parallel to the ordinate axis, they furthermore indicate the direction of flow in an adsorber: when an arrow is in the direction of increasing ordinate (towards the top of the diagram), the direction of flow in the adsorber is cocurrent. If the arrow directed upwards lies below the line indicating the pressure in the adsorber, the stream enters the adsorber through the inlet end of the adsorber; if the arrow directed upwards, lies above the line indicating the pressure, the current leaves the adsorber through the outlet end of the adsorber, the inlet and outlet ends being respectively those for the gas to be treated by the adsorber in question and for the gas withdrawn from the same adsorber in the adsorption phase. When an arrow is in the direction of decreasing ordinate (towards the bottom of the diagram), the direction of the stream in the adsorber is countercurrent. If the arrow directed downwards lies below the line indicating the pressure of the adsorber, the current leaves the adsorber through the inlet end of the adsorber; if the arrow directed downwards lies above the line indicating the pressure, the current enters the adsorber through the outlet end of the adsorber, the inlet and outlet ends still being those for the gas to be treated and for the gas withdrawn in the adsorption phase.

In the example in question, the high pressure PM of the cycle is much greater than atmospheric pressure and is typically chosen to be equal to 1.40 bar, while the low pressure Pm of the cycle is much lower than atmospheric pressure, and is typically chosen to be equal to 0.4 bar.

The cycle will be described below for one adsorber, namely the adsorber 1A, and for the nominal oxygen-production rate. The other adsorber 1B follows a cycle which is identical but shifted in time by one half-period T/2.

The cycle consists of the following successive steps:

(a) Recompression phase:

(a1) From t=0 to t1, a step of countercurrent first recompression by balancing pressures with the other adsorber which is in the cocurrent first decompression step (c1) described below. At time t1, the pressure has risen to an intermediate value PE.

(a2) From t1 to t2, a step of cocurrent final recompression by means of air coming from the compressor. At time t2, the pressure is close to the maximum value PM.

(b) Production-phase (approximately isobaric):

(b1) From t2 to t3, a first cocurrent adsorption step, in which the air to be treated is introduced via the pipe 4 at the inlet of the adsorber at close to the pressure PM and flows in cocurrent through it. The production oxygen is withdrawn at the outlet of the adsorber and sent into the production pipe 9.

(b2) From t3 to T/2, a second cocurrent adsorption step, which differs from the previous one only by the fact that a fraction of the oxygen produced is taken from the outlet of the adsorber and sent in countercurrent into the other adsorber which is in the purge/elution phase (c3) described below.

(c) Phase of regenerating the adsorbent:

(c1) From T/2 to t4, a step of cocurrent first decompression by balancing pressures with the other adsorber which is in the countercurrent first recompression phase (a1) described above. During this step, the pressure of the adsorber falls from PM to the intermediate value PE.

(c2) From t4 to t5, a step of countercurrent purging with evacuation. During this step, the inlet of the adsorber is connected to the vacuum pump, which reduces the pressure to the low pressure Pm of the cycle.

(c3) From t5 to T, a purge/elution phase at close to the low pressure Pm. During this step, the inlet of the adsorber is still connected to the vacuum pump and, at the same time, its output is connected to that of the other adsorber, which is in the second adsorption step (b2). As illustrated in FIG. 2, during this second step (c3) the pressure rises slightly above the low pressure (Pm).

In the example in question, the durations of the various steps are:

T(a1)=7 s
T(a2)=15 s
T(b1)=5 s
T(b2)=10 s
T(c1)=7 s
T(c2)=20 s
T(c3)=10 s

The duration of the cycle is therefore T≈74 s.

In order to simplify the graph of the cycle, full balancing of the pressures in steps (a1) and (c1) as well as isobaric production has been assumed. As a variant, however, the balancing of the pressures may be only partial, which corresponds to PE(c1)>PE(a1). Furthermore, the production phase may start at a pressure lower than PM. Similarly, the elution may be carried out at decreasing pressure and Pm may be obtained during this step.

FIG. 3 illustrates a modification of the cycle in FIG. 2 for a reduced production rate. This modification consists only in shortening steps (a2), (b1) and (c2) corresponding to the rise to the final pressure, to the first adsorption step and to the final decompression of the adsorber. In this example, the corresponding durations have become t(a2)=13.5 s, t(b1)=3.5 s and t(c2)=17 s. The duration of the cycle is consequently reduced to T=68 s.

As a variant, it would be possible to keep the duration of step (b1) constant.

Because of the shortening of step (a2), the high pressure PM reached is reduced to 1.28 bar. Similarly, the shortening of step (c2) raises the low pressure Pm to 0.43 bar. The ratio PM/Pm consequently changes from 1.40/0.40=3.5 to a lower value 1.28/0.43 =2.98.

The effect of this is to make the adsorber less productive, since the adsorption pressure is reduced and the regeneration pressure is increased. This reduction in productivity is chosen to balance, on the one hand, the drop in production and, on the other hand, the increase in the number of cycles per hour, and consequently to obtain production of oxygen with unchanged purity.

At the same time, the energy consumed per cycle decreases substantially since the pressure levels are more favourable. Overall, the specific energy $E_s$ is substantially maintained in reduced-load operation.

The variant of the cycle in FIG. 4 differs from the previous one only by the fact that the pressure-balancing steps (a1) and (1c) are both lengthened by the same period of time so as to return to the initial duration of the cycle T=74 s. Thus, t(a1)≈t(c1)=10 s.

The extreme pressures remain PM=1.28 bar and Pm=0.43 bar.

An operating point is thus obtained with production equal to 85% of the nominal rate and a specific energy 2% lower than the nominal specific energy.

This improvement is explained by the beneficial effect of lengthening the balancing step, during which the Kinetic effects are pronounced.

The lengthening of steps (a1) and (c1) may be obtained by using as valve 13 a valve whose opening is controlled in a programmable progressive ramp, as described for example in document FR-A-2,756,752.

The reduction of the pressure PM, according to the method in FIGS. 3 and 4, is in practice limited to the delivery pressure required at the pipe 9, and therefore to a value greater than atmospheric pressure.

If the drop in production is significant, in practice more than 20% for the pressures taken by way of example, the ratio PM/Pm continues to be reduced, but by keeping PM constant and by raising Pm.

To do this, the duration of the final decompression step (c2) may continue to be reduced.

As a variant, or in addition, a dead time or waiting time may be added between steps (c1) and (c2), and possibly between steps (a1) and (b1). For each of these dead times, the adsorber is isolated and the corresponding machine is set to idle operation by opening the associated valve 17 or 18.

Thus, in the example in FIG. 5, the duration t(c2) is reduced by 2 s, and a dead time ΔT=t'4–t4=2s is inserted between steps (c1) and (c2). The pressure Pm is then 0.45 bar.

Figure 6:
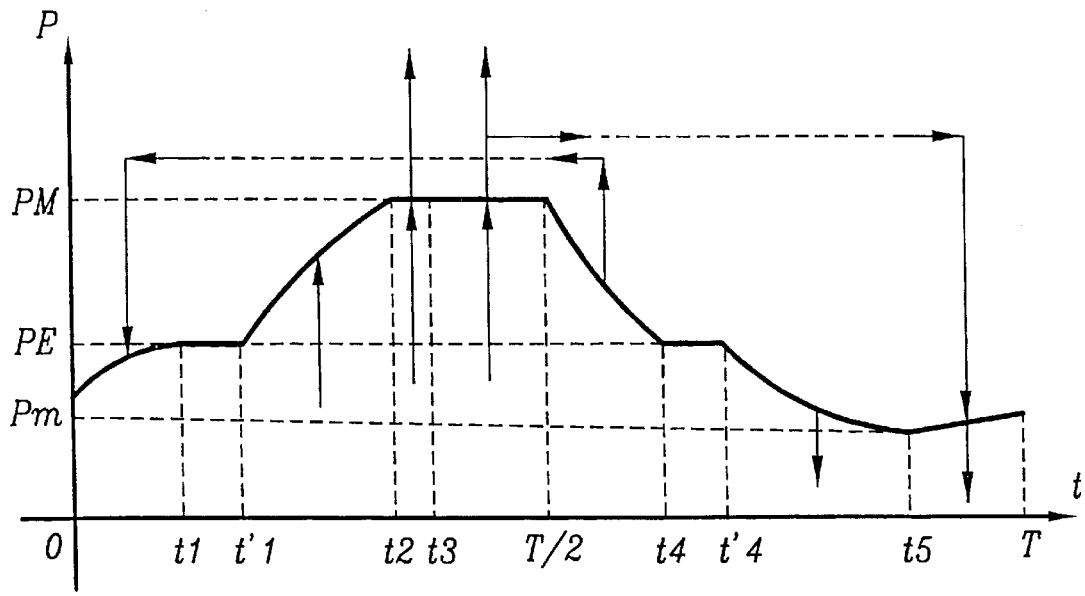

In the example in FIG. 6, the only modification relative to the cycle in FIG. 4 consisted in introducing two dead times (t1, t'1) and (t4, t'4) between steps (a1) and (a2) on the one hand, and (b1) and (b2) on the other hand. The cycle is therefore lengthened by the sum of the durations of the two dead times, and the pressure Pm remains at the value 0.43 bar of the cycle in FIG. 4.

Figure 7:
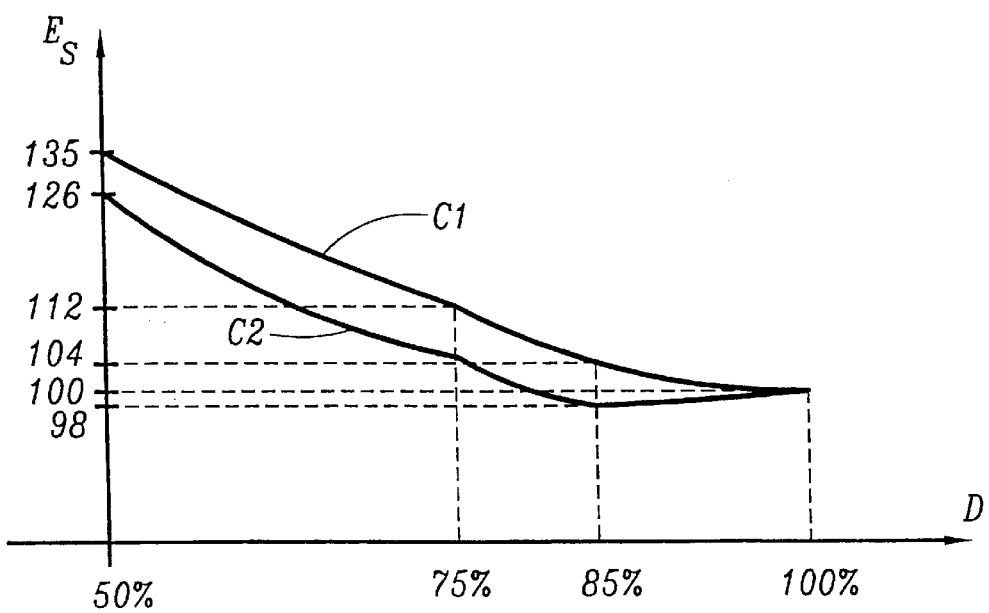
FIG. 7 is a diagram which shows the energy saving which the invention makes it possible to obtain.

FIG. 7 illustrates the variation in overall specific energy $E_s$ as a function of the production rate D, the variation being obtained from experimental results.

The upper curve C1 corresponds to the conventional technique in which the cycle is not modified. In this case, the specific energy $E_s$ changes from 100 for D=100% (that is to say for the nominal pressure) to 112 for D=75% and to 135 for D=50%.

The lower curve C2 corresponds to implementation of the invention.

With the modification to the cycle according to FIG. 4, $E_s$ changes to 98 for D=85%. For lower values of D, the variant in FIG. 6 is adopted, and $E_s$=104 is obtained for D=75% and $E_s$=126 for D=50%.

It will be noted that the values in FIG. 7 are indicative values. The values actually obtained depend, in particular, in the consumption of the machines during idle running, which itself depends on the head losses in the supply and delivery circuits, the characteristics of the machines, etc.

As will be understood, the production for unit can be driven by a programmable automatic controller so as to modify the cycle in one of the ways described above according to the demand for oxygen on the production pipe 9.

In certain cases, the cycles described above may be implemented with a number of adsorbers greater than 2, in particular in the case of high-capacity plants.

What is claimed is:

1. Process for treating a gas mixture by pressure swing adsorption, in which at least one adsorber is used, in which a cycle comprising the following successive steps is carried out for a given nominal production of production gas:

a phase of production by circulating the mixture through the adsorber in a cocurrent direction and recovering a fraction enriched in less adsorbable compounds, during which phase a maximum pressure PM of the cycle is reached, a regeneration phase, including at least one depressurization step during which a minimum pressure Pm of the cycle is reached, and a phase of repressurizing the adsorber to an initial pressure of the production phase, wherein, in the case of a reduction in the production rate, the maximum pressure PM is lowered and the ratio PM/Pm is reduced.

2. Process according to claim 1, wherein, in the case of a reduction in the production rate, the duration of a step (a2) of final recompression of the adsorber with the mixture is reduced so as to reduce the maximum pressure PM.

3. Process according to claim 2, wherein, in the case of a reduction in the production rate, the durations of the other steps of the cycle are kept unchanged.

4. Process according to claim 2, wherein, in the case of a reduction in the production rate, at least one of the duration of a countercurrent first recompression step (a1) of the repressurization phase and the duration of a cocurrent first decompression step (c1) of the regeneration phase is extended.

5. Process according to claim 4, wherein said at least one adsorber comprises two adsorbers, and in the case of a reduction in the production rate, the duration of the countercurrent first recompression step (a1) and that of the cocurrent first decompression step (c1) are extended, these being two concomitant steps which ensure full or partial balancing of the pressures between the two adsorbers.

6. Process according to claim 1, wherein, in the case of a reduction in the production rate, the duration of the depressurization step is reduced so as to raise the minimum pressure Pm.

7. Process according to claim 1, wherein, in the case of a reduction in the production rate, at least one dead time (t1, t'1; t4, t'4), during which the adsorber (1A, 1B) is isolated, is added to the cycle.

8. Process according to claim 7, wherein the dead time is arranged after at least one of a countercurrent first recompression step (a1) of the repressurization phase and a cocurrent first decompression step (c1) of the regeneration phase.

9. Process according to claim 1, wherein the cycle successively comprises, during the regeneration phase, a cocurrent first decompression step (c1), a countercurrent second decompression step (c2) and a step (c3) of countercurrent elution with the production gas.

10. Process according to claim 1, wherein the gas mixture to be treated is air.

11. Process according to claim 10, wherein the production gas is oxygen whose purity is substantially the same for the nominal production rate and for the reduced production rate.

12. Process according to claim 10, wherein the maximum cycle pressure PM is substantially greater than atmospheric pressure and the minimum cycle pressure Pm lies in the range 0.20 to 0.65 bar.

13. Process according to claim 12, wherein the maximum cycle pressure ranges between 1.2 and 2 bar, and the minimum cycle pressure ranges between 0.3 to 0.45 bar abs.

14. Process according to claim 13, wherein the maximum cycle pressure ranges between 1.35 and 1.65 bar.

* * * * *